United States Patent [19]

Tomlinson

[11] Patent Number: 4,842,128
[45] Date of Patent: Jun. 27, 1989

[54] INSPECTION LINE PANS

[75] Inventor: James E. Tomlinson, Barnsley, United Kingdom

[73] Assignee: Anderson Strathclyde PLC, United Kingdom

[21] Appl. No.: 123,068

[22] PCT Filed: Feb. 2, 1987

[86] PCT No.: PCT/GB87/00069
§ 371 Date: Nov. 16, 1987
§ 102(e) Date: Nov. 16, 1987

[87] PCT Pub. No.: WO87/04687
PCT Pub. Date: Aug. 13, 1987

[30] Foreign Application Priority Data

Feb. 5, 1986 [GB] United Kingdom ................ 8602862

[51] Int. Cl.$^4$ .............................................. B65G 19/28
[52] U.S. Cl. ................................. 198/735; 198/860.3
[58] Field of Search ................... 198/735, 860.3, 860.4

[56] References Cited

U.S. PATENT DOCUMENTS 4,624,362 11/1986 Temme et al. ...................... 198/735
4,637,510 1/1987 Tomlinson .......................... 198/735
4,705,160 11/1987 Gründken et al. ........... 198/860.3 X

FOREIGN PATENT DOCUMENTS 1258333 1/1968 Fed. Rep. of Germany .
2154532 9/1985 United Kingdom .

Primary Examiner—Robert J. Spar
Assistant Examiner—Cheryl L. Gastineau
Attorney, Agent, or Firm—Lalos & Keegan

[57] ABSTRACT

The inspection line pan has an opening (11), in its deck plate (10) and a three-piece door (12) located in the opening. The door is formed of three rectangular panels (15, 16, 17) of similar length and width which are disposed transversely of each other. The outer panels (15, 17) are pivotally connected to the center panel (16) and the center panel has transverse grooves (18) which are supported on tongues on central portions of the opening (10) for transverse movement. In use, one or other outer panel can be pivotally raised for inspection below the line pan. If access to the area below the line pan is required, the center panel can be slid transversely into the space created by the raised outer panel and after the center panel is free of the tongues, it can be lifted clear of the opening. If the outer panels are attached to the center panel, they are lifted clear of the opening with the center panel; otherwise they are removed separately.

11 Claims, 2 Drawing Sheets

INSPECTION LINE PANS

This invention relates to inspection line pans for Armoured Face Conveyors (AFC).

A conventional AFC comprises a series of line pans joined end to end and an endless chain which runs over and under these pans. In order to gain access to the underside of the pans, inspection pans are placed at intervals along the conveyor. Thus it is possible to gain access to the bottom chain, to inspect for damage, to re-couple broken chains or to remove broken flight bars which are carried transversely of the conveyor by the chains.

To date, an inspection line pan has included a single door located in the centre of the deck plate of the pan, and retained closed by staples. Such a pan is only suitable for use with chains disposed along the sides of the pan, i.e, twin out-board chains, because if centre strand chain is used, the chain which runs along the centre of the deck plate prevents removal of the door. A centre strand chain therefore has to be uncoupled prior to removal of the door. This is a time consuming operation, particularly if a visual inspection of the bottom chain is all that is required during the search for broken or jammed chains.

So far, attempts to overcome the aforementioned disadvantage have normally led to a weakening of the structure because part of the sigma section of the inspection line pan has had to be removed.

An object of this invention is to obviate or mitigate the aforementioned disadvantages.

According to the present invention there is provided an inspection line pan having an opening in the deck plate thereof and a door in said opening, said door comprising three panels transversely disposed to each other, the centre panel being supported on a slideway on the line pan for transverse movement and the two outer panels being pivotal on the centre panel about the longitudinal sides thereof and supported, when horizontal, at their extreme outer sides by the line pan, each outer panel being pivotally liftable to allow inspection therebelow and to create a space into which the centre panel can slide transversely at the side of the line pan opening, for removal of the panels when repair is required below the line pan.

Thus, with centre strand chains passing over the line pans, it is possible to inspect and make repairs under the deck plate without the need to dismantle the upper run chains.

Preferably, the outer panels are hingedly attached to the centre panel.

Alternatively, the outer panels are pivotally supported on the centre panel preferably by lap joints.

An embodiment of the present invention will now be described, by way of example, with reference to the accompanying drawings, in which.

Figure 1:
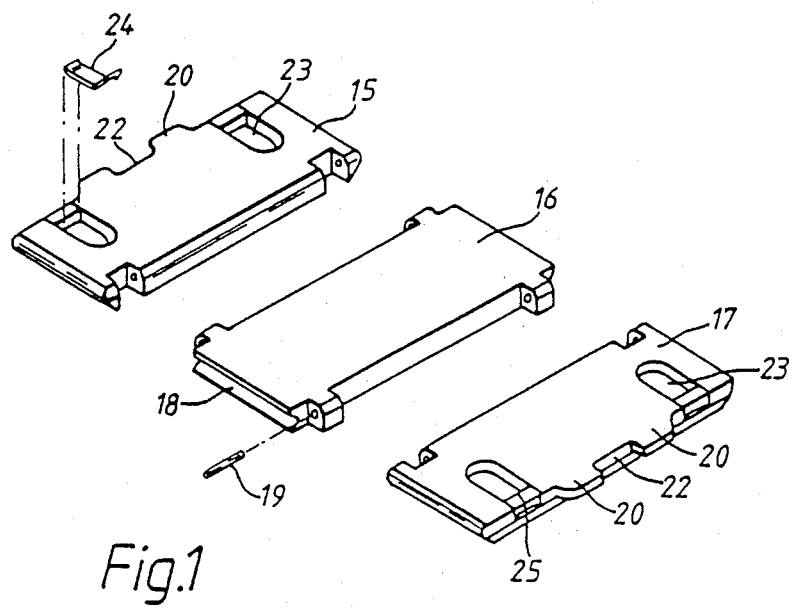
FIG. 1 is an exploded isometric view of the door of an inspection line pan according to the invention.
Figure 2:
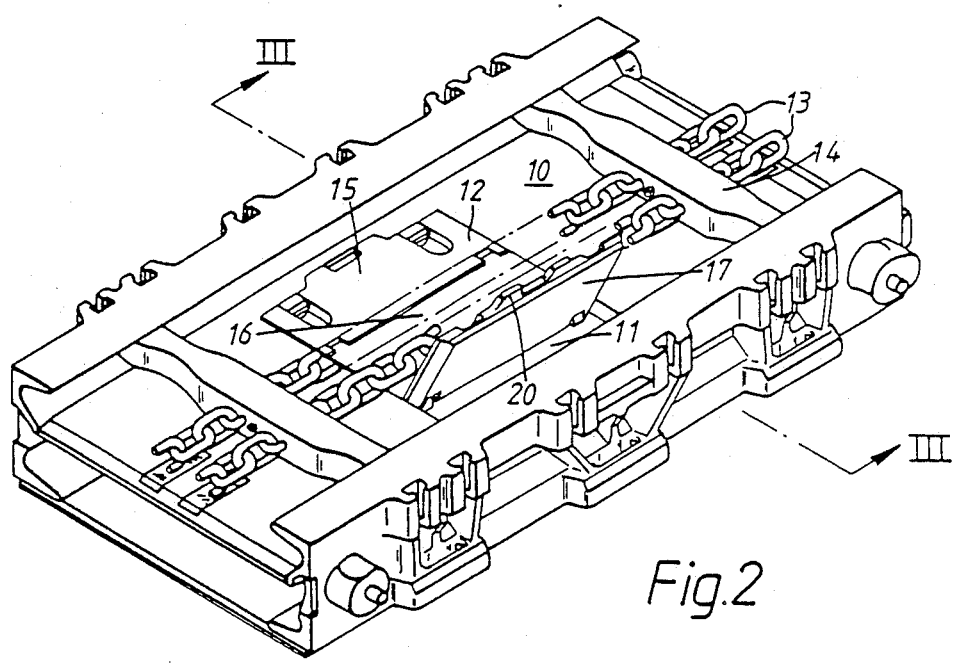
FIG. 2 is an isometric view of the inspection line pan with the door partially open, for inspection purposes.

Referring to the drawings, the inspection line pan has a deck plate 10 in which is located an opening 11 closed by a three-piece door 12. A pair of side by side centre strand chains 13 run longitudinally over the centre of the door and carry transverse flight bars 14 by which coal or other minerals are drawn along the line pan assembly of which the inspection line pan forms part.

The door 12 comprises three substantially rectangular panels 15 to 17 of similar length and width disposed transversely of each other with their longer sides longitudinal of the line pan. The centre panel 16 has transverse end faces 18, grooved to engage a slideway tongue 18A, FIG. 3 (not shown) on each opposed transverse side of the opening 11. Each tongue is located centrally and has a length similar to the width of the centre door part 16. The two transversely outer panels 15, 17 of the door are hingedly attached along one side by hinges 19 to the centre panel 16 and their other side has protrusions 20 which locate over supporting flanges 21 (FIG. 4) on the longitudinal sides of the line pan opening 11. Between the protrusions 20 of each outer door panel 15, 17 is a recess 22 to allow lifting of the outer panel.

Each outer door part 15, 17 also has recesses 23 in its upper face to receive staples 24 by which these door parts are secured in the closed position.

Figure 3:
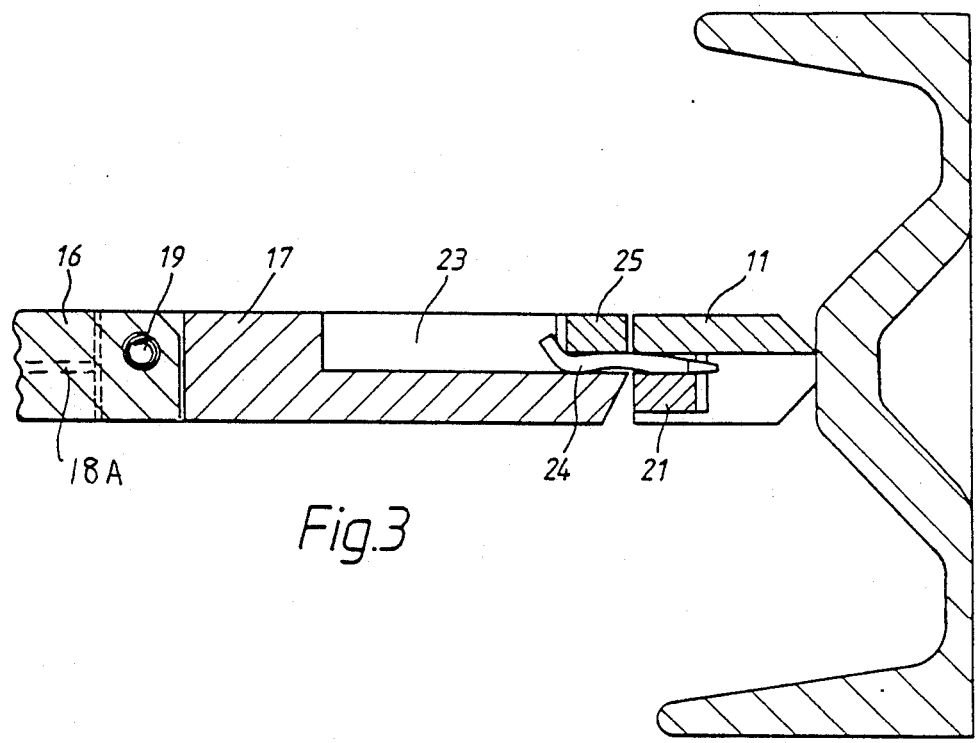
FIG. 3 is a transverse cross sectional view of the line III—III of FIG. 2.

As illustrated in FIG. 3 each recess 23 has a bridge part 25 under which the staple 24 locates to extend transversely into a space below the deck plate 11 and above the flange 21. The protrusions 20 on the outer door part 17 (not shown in FIG. 3) rests on the flange 21 when the door part 17 is in the closed position.

In use, the pair of centre strand chains 13 extend along the line pans and pass over only the center part 16 of the inspection door. Thus, one or other outer door panel 15, 17 can be pivotally lifted to allow inspection below the deck plate 10 of the inspection line pan. If work is to be done, e.g. to repair a broken chain, the centre panel 16 is slid transversely along the supporting tongues 18A into the space vacated by the upwardly pivoted outer door panel. Once the centre panel 16 is free of the tongues, it can be lifted clear of the opening and as the other outer door panel is attached to it, the entire three-piece door can thus be removed.

Figure 4:
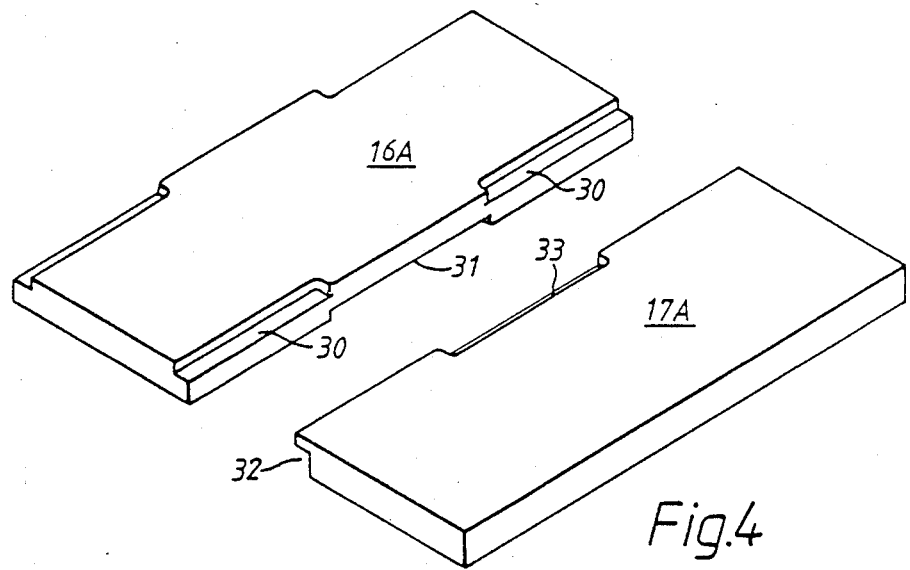
FIG. 4 illustrates a modified, lap joint door arrangement.

In a modification FIG. 4, the outer door panels 15A/17A are not hinged to the centre panel 16A, but simply lapped thereto, thus enabling pivotal lifting of the outer panels for inspection. However, the panels 15A, 16A, 17A are removed singly when it is desired to completely uncover the opening 11.

A suitable lap joint is illustrated in FIG. 4 wherein the centre part 16A has a pair of upper step portions 30 along each longitudinal side separated by a centre lower recess 31. The outer parts 15A, 17A, of which only part 17A is shown have complementary recesses 32, and step 33. The outer parts 15A, 17A also have the staple recesses 23 and protrusions 20 as in the preferred embodiment, but these are not shown. Similarly, the centre part 16A has grooved end faces 18, not shown.

In use, the outer part 17A is drawn fractionally transversely away from the centre part 16A before it can be pivoted upwards for inspection purposes.

Thus, an inspection line pan as hereinbefore described is advantageous in that the three piece door provides an easy access from either side for inspection and easy removal of the door from below the centre chains, and furthermore, there is now no need to dismantle the chain extending along the top of the line pan in order to gain access to the inspection door.

I claim:

1. An inspection line pan having an opening (11) in the deck plate (10) thereof and a door (12) in said opening, characterized in that said door (12) comprising three panels (15, 16, 17) transversely disposed to each other, the centre panel (16) being supported on a slideway on the line pan for transverse movement and the two outer panels (15, 17) being pivotal on the centre panel (16) about the longitudinal sides thereof and supported, when horizontal, at their extreme outer sides by the line pan, each outer panel being pivotally liftable to allow inspection therebelow and to create a space into which the centre panel can slide transversely at that side of the line pan opening, for removal of the panels when repair is required below the line pan.

2. An inspection line pan according to claim 1, characterized in that the outer panels (15, 17) are hingedly attached to the centre panel (16).

3. An inpsection line pan according to claim 1, characterized in that the outer panels (15, 17) are pivotally supported on the centre panel (16).

4. An inspection line pan according to claim 3, characterized in that the outer panels (15, 17) are pivotally supported on the centre panel by lap joints.

5. An inspection line pan according to any one of claims 1 to 4, characterized in that the outer panels (15, 17) have protrusions (20) on their outer sides for location when horizontal over support flanges (21) on the longitudinal sides of the opening (11) in the line pan.

6. An inspection line pan according to claim 5 in which the outer panels (15,17) when horizontal are secured to the line pan.

7. An inspection line pan according to claim 5 characterized in that the centre panel (16) has grooved transverse end faces (19) which engages a tongue 18A at each opposed transverse side of the opening (11).

8. An inspection line pan according to any one of claims 1 to 4, in which the outer panels (15, 17) when horizontal are secured to the line pan.

9. An inspection line pan according to claim 8 characterized in that the centre panel (16) has grooved transverse end faces (18) which engage a tongue 18A at each opposed transverse side of the opening (11).

10. An inspection line pan according to any one of claims 1 to 4, characterized in that the centre panel (16) has grooved transverse end faces (18) which engage a tongue 18A at each opposed transverse side of the opening (11).

11. An inspection line pan according to claim 10, characterized in that each tongue 18A is located centrally of the opening (11) and has a length similar to the width of the centre panel (16), so that when the centre panel is slid transversely into the space vacated by an outer panel (15 or 17) the grooved end faces (18) are freed from the tongues to enable removal of the centre panel from the opening (11).

* * * * *